US006434907B1

(12) United States Patent
Simboli

(10) Patent No.: US 6,434,907 B1
(45) Date of Patent: Aug. 20, 2002

(54) CLOSED CHANNEL STRUCTURAL MEMBER HAVING INTERNAL REINFORCEMENT FOR VEHICLE BODY AND FRAME ASSEMBLY

(75) Inventor: Andrew R. Simboli, Coatesville, PA (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/533,885

(22) Filed: Mar. 22, 2000

(51) Int. Cl.[7] .................................................. E04C 3/30
(52) U.S. Cl. ...................... 52/731.6; 52/735.1; 296/188; 296/189; 296/193; 296/204; 296/205; 296/146.6
(58) Field of Search .............................. 52/731.2, 731.6, 52/732.1, 735.1, 739.1, 737.1, 737.4, 737.6, 729.2, 729.1, 729.5, 738.1, 733.3, 736.2; 296/29.3, 187, 188, 189, 193, 204, 205, 146.6

(56) References Cited

U.S. PATENT DOCUMENTS

| | | | |
|---|---|---|---|
| 2,174,915 A | | 10/1939 | Dietrich |
| 2,194,349 A | | 3/1940 | Almdale |
| 2,384,096 A | | 9/1945 | Kishline |
| 2,718,288 A | * | 9/1955 | Boyer |
| 2,809,050 A | | 10/1957 | Bauer |
| 5,362,121 A | | 11/1994 | Enning et al. |
| 5,486,078 A | * | 1/1996 | Wise et al. ................ 410/155 |

* cited by examiner

Primary Examiner—Carl D. Friedman
Assistant Examiner—Yvonne M. Horton
(74) Attorney, Agent, or Firm—MacMillan, Sobanski & Todd, LLC

(57) ABSTRACT

A closed channel structural member, such as a side rail or a cross member, for use in a vehicle body and frame assembly, includes an internal reinforcing structure to increase the strength and rigidity thereof. Portions of the side rail are removed so as to provide an opening. This can be accomplished by forming two flanges that can be bent inwardly within the side rail to form the opening. A combined internal reinforcing member and mounting bracket is assembled to the side rail by moving it laterally such that a pair of side walls and an upper wall are inserted through the opening formed through the side rail until tabs provided on the side walls and the upper wall of the reinforcement member and mounting bracket abut the outer surface of the side rail. Then, portions of the reinforcing member and bracket are secured to the side rail by welding. When assembled with and secured to the side rail, the reinforcing member and bracket functions as a dual purpose member, providing structural reinforcement for the side rail and simultaneously providing a mounting point for an ancillary component of the vehicle, such as a shock absorber, body portion, and the like. If desired, the reinforcing member can function as a single purpose member, solely providing structural reinforcement for the side rail.

20 Claims, 9 Drawing Sheets

CLOSED CHANNEL STRUCTURAL MEMBER HAVING INTERNAL REINFORCEMENT FOR VEHICLE BODY AND FRAME ASSEMBLY

BACKGROUND OF THE INVENTION

This invention relates in general to body and frame assemblies for vehicles. More specifically, this invention relates to an improved structure for a closed channel structural member, such as a side rail or a cross member, for use in such a vehicle body and frame assembly that includes an internal reinforcing structure to increase the strength and rigidity thereof.

Many land vehicles in common use, such as automobiles, vans, and trucks, include a body and frame assembly that is supported upon a plurality of ground-engaging wheels by a resilient suspension system. The structures of known body and frame assemblies can be divided into two general categories, namely, separate and unitized. In a typical separate body and frame assembly, the structural components of the body portion and the frame portion of the vehicle are separate and independent from one another. When assembled, the frame portion of the assembly is resiliently supported upon the vehicle wheels by the suspension system and serves as a platform upon which the body portion of the assembly and other components of the vehicle can be mounted. Separate body and frame assemblies of this general type are found in most older vehicles, but remain in common use today for many relatively large or specialized use modern vehicles, such as large vans, sport utility vehicles, and trucks. In a typical unitized body and frame assembly, the structural components of the body portion and the frame portion are combined into an integral unit that is resiliently supported upon the vehicle wheels by the suspension system. Unitized body and frame assemblies of this general type are found in many relatively small modern vehicles, such as automobiles and minivans.

Traditionally, the various components of vehicular body and frame assemblies have been formed from open channel structural members, i.e., structural members that have a non-continuous cross sectional shape (such as U-shaped or C-shaped channel members, for example). For example, it is known to use one or more open channel structural members to form the side rails, the cross members, and other components of a ladder frame type of separate body and frame assembly. To facilitate the connection of the body portion to the frame portion, a plurality of body mount support brackets are secured to the side rails of the frame portion. Such body mount support brackets have traditionally been formed from stampings that were bent or otherwise deformed to desired shapes to provide supports for the body mounts used to connect the various structural members of the body portion thereto. The use of such stamped body mount support brackets was relatively easy with traditional open channel structural members used to form the ladder frame assembly because both the stamped body mount brackets and the side rails were generally rectilinear in shape. However, the use of open channel structural members to form the various components of vehicular body and frame assemblies has been found to be undesirable for several reasons.

To address this, it has been proposed to form one or more of the components of the vehicular body and frame assemblies from closed channel structural members, i.e., structural members that have a continuous cross sectional shape (such as tubular or box-shaped channel members, for example). This cross sectional shape is advantageous because it provides strength and rigidity to the vehicle body and frame component. Also, in those instances where the vehicle body and frame component has a generally rectilinear cross sectional shape, vertically and horizontally oriented surfaces are provided that are well adapted to have the body mount support brackets discussed above secured thereto. Furthermore, closed channel structural member are well suited to be deformed to a desired shape by hydroforming, which is a well known process that uses pressurized fluid supplied within the closed channel structural member to deform it into conformance with a surrounding die. Hydroforming has been found to be a desirable forming process because portions of a closed channel structural member can be quickly and easily deformed to have a complex cross sectional shape.

Although closed channel structural members provide strength and rigidity to the vehicle body and frame component, there are instances where it is necessary or desirable to further increase the strength and rigidity thereof. For example, it may be necessary or desirable to reinforce the strength of a closed channel structural member at one or more locations throughout the length thereof to prevent deformation under extreme operating conditions, such as during a collision. Also, it may be desirable to reinforce the strength of a closed channel structural member at one or more locations throughout the length thereof where mounting brackets or other ancillary components are secured thereto. Because of their inherent closed cross sectional shape, however, it has been found to be difficult to provide such reinforcement in closed channel structural members, particularly without changing the shape of outer surface thereof.

Thus, it would be desirable to provide an improved structure for a closed channel structural member, such as a side rail or a cross member, for use in a vehicle body and frame assembly, that includes an internal reinforcing structure to increase the strength and rigidity thereof.

SUMMARY OF THE INVENTION

This invention relates to an improved structure for a closed channel structural member, such as a side rail or a cross member, for use in a vehicle body and frame assembly, that includes an internal reinforcing structure to increase the strength and rigidity thereof. Portions of the side rail are removed so as to provide an opening. This can be accomplished by forming two flanges that can be bent inwardly within the side rail to form the opening. A combined internal reinforcing member and mounting bracket is assembled to the side rail by moving it laterally such that a pair of side walls and an upper wall are inserted through the opening formed through the side rail until tabs provided on the side walls and the upper wall of the reinforcement member and mounting bracket abut the outer surface of the side rail. Then, portions of the reinforcing member and bracket are secured to the side rail by welding. When assembled with and secured to the side rail, the reinforcing member and bracket functions as a dual purpose member, providing structural reinforcement for the side rail and simultaneously providing a mounting point for an ancillary component of the vehicle, such as a shock absorber, body portion, and the like. If desired, the reinforcing member can function as a single purpose member, solely providing structural reinforcement for the side rail.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
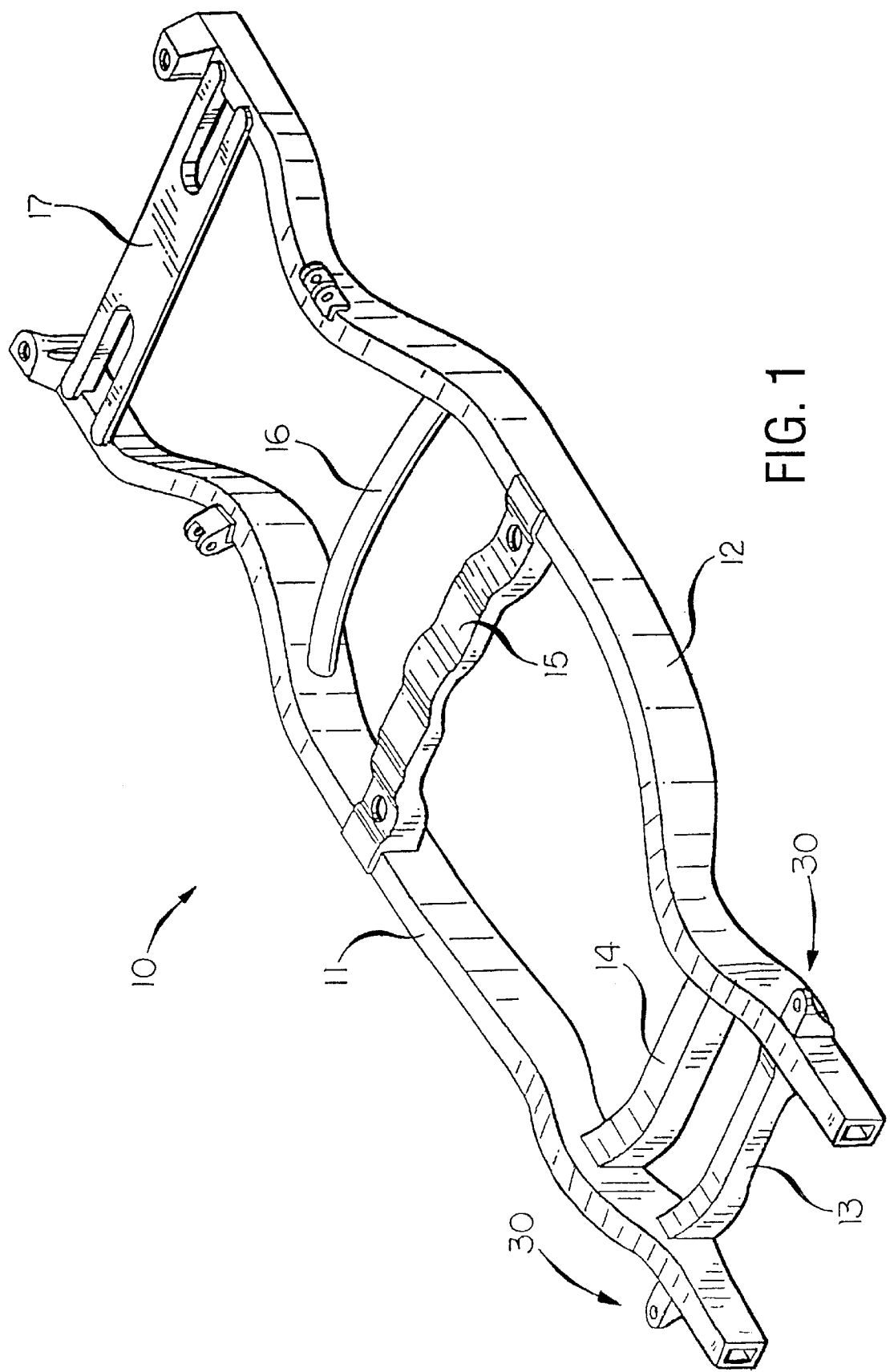
FIG. 1 is a perspective view of a body and frame assembly for a vehicle including a first embodiment of a closed channel structural member having a combined internal reinforcing member and mounting bracket secured thereto in accordance with this invention.

Referring now to the drawings, there is illustrated in FIG. 1 a portion of a first embodiment of a vehicle body frame assembly, indicated generally at 10, in accordance with this invention. The vehicle frame assembly 10 is generally conventional in the art, and only those portions thereof that are necessary for a complete understanding of this invention will be described and illustrated. Furthermore, it will be appreciated that the illustrated vehicle frame assembly 10 is intended to be representative of any conventional structure, separate or unitized, for a frame assembly for use in a vehicle. The illustrated vehicle frame assembly 10 is a ladder frame assembly including a pair of longitudinally extending side rails 11 and 12 or similar structural members having a plurality of transverse cross members 13, 14, 15, 16, and 17 or similar structural members extending therebetween. The side rails 11 and 12 extend longitudinally throughout the entire length of the assembly 10 and are generally parallel to one another. Each of the side rails 11 and 12 in the illustrated embodiment is formed from a single closed channel structural member. However, it will be appreciated that one or both of the side rails 11 and 12 may be formed from a plurality of individually formed closed channel structural members that are secured together by any conventional means, such as by welding, riveting, bolting, and the like. Furthermore, portions of the side rails 11 and 12 may be formed from open channel structural members if desired.

The cross members 13 through 17 extend generally perpendicular to the side rails 11 and 12 and may be formed having any conventional structure. The cross members 13 through 17 are spaced apart from one another along the length of the ladder frame assembly 10 and can be secured to the side rails 11 and 12 by any conventional means, such as by welding, riveting, bolting, and the like. When secured to the side rails 11 and 12, the cross members 13 through 17 provide lateral and torsional rigidity to the ladder frame assembly 10. The structure of the vehicle body and frame assembly 10 thus far described is conventional in the art.

Figure 2:
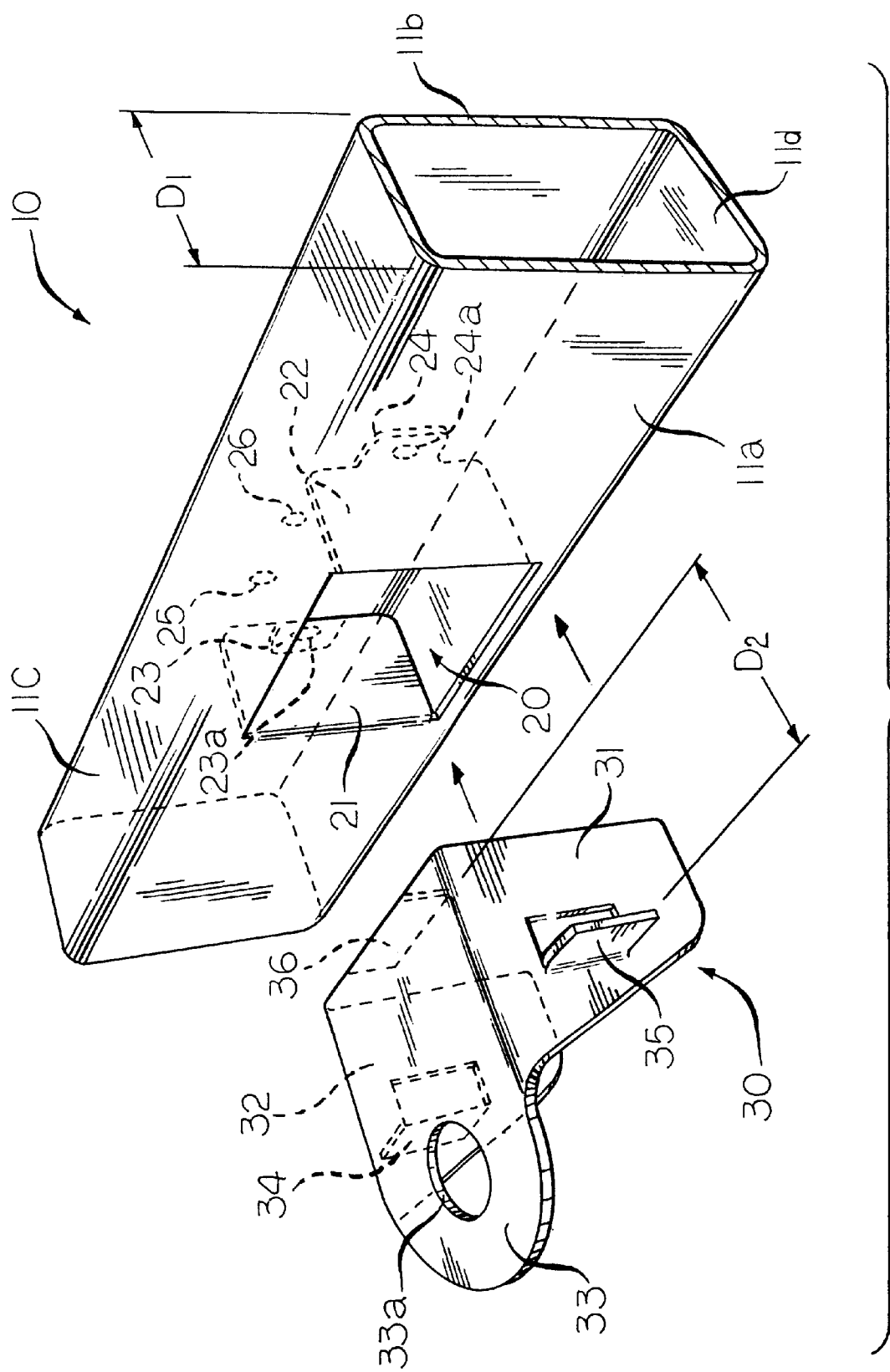
FIG. 2 is an enlarged exploded perspective view of a portion of the first embodiment of the closed channel structural member and combined internal reinforcing member and mounting bracket illustrated in FIG. 1.
Figure 3:
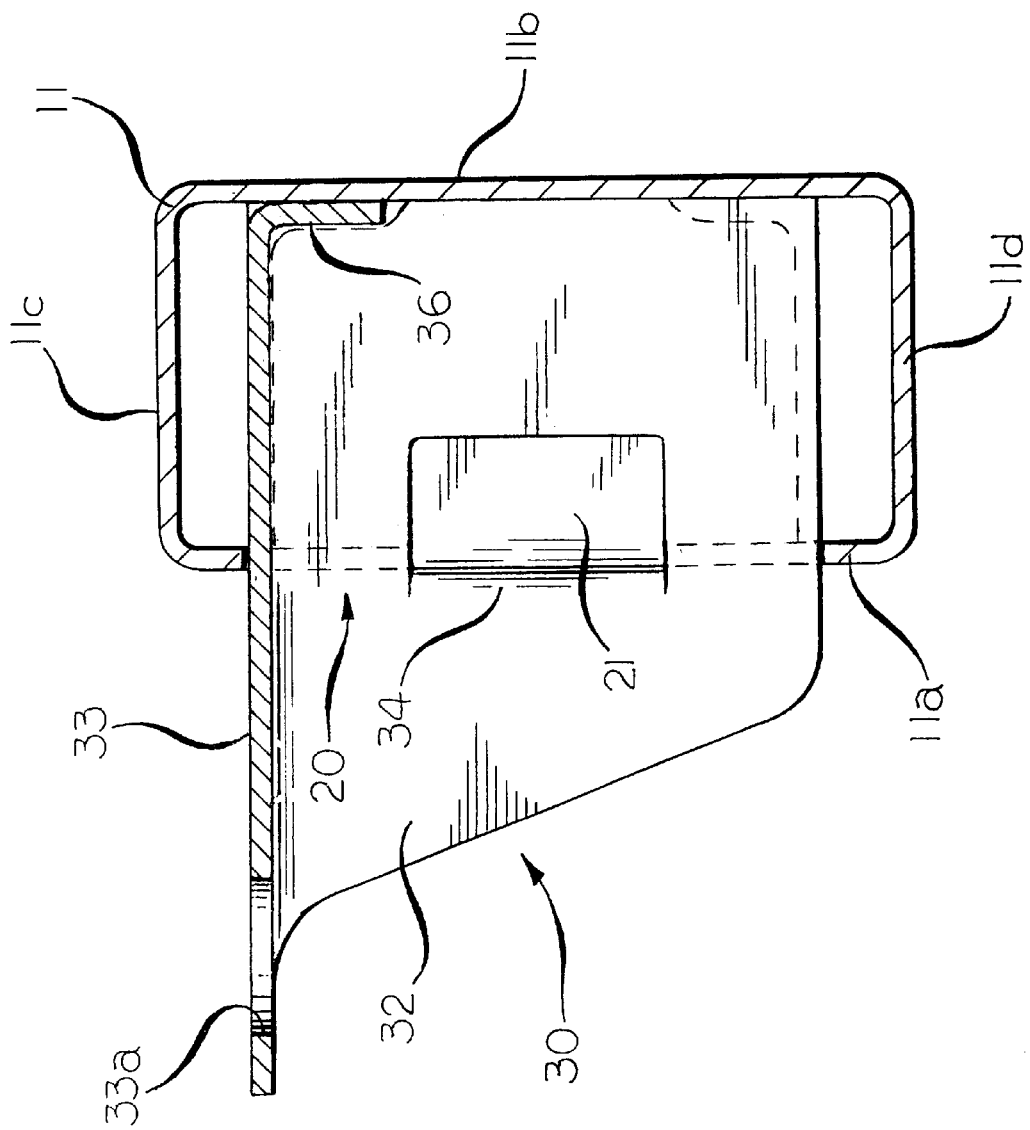
FIG. 3 is an enlarged sectional elevational view of the closed channel structural member and combined internal reinforcing member and mounting bracket illustrated in FIG. 2 shown assembled.

The structure of a portion of the side rail 11 is illustrated in detail in FIGS. 2 and 3. Although this invention will be described and illustrated in context of the side rail 11, it will be appreciated that this invention may be practiced with any or all of the other structural members of the vehicle frame assembly 10 discussed above. The illustrated side rail 11 is generally rectangular in cross sectional shape and includes an outer wall 11a (i.e., a wall that faces outwardly from the other side rail 12), an inner wall 11b (i.e., a wall that faces toward the other side rail 12), an upper wall 11c, and a lower wall 11d. The outer wall 11a and the inner wall 11b are spaced apart from one another by a first distance $D_1$. Although this invention will be described and illustrated in context of the side rail 11 having this generally rectangular cross sectional shape, it will be appreciated that this invention may be practiced with a side rail 11 having any desired cross sectional shape.

An opening, indicated generally at 20, is formed through the outer wall 11a of the side rail 11. Although this invention will be described and illustrated with the opening 20 formed through the outer wall 11a, it will be appreciated that the invention can be practiced by forming the opening through any of the walls 11a, 11b, 11c, and 11d. The opening 20 can be formed in any desired manner, such as by a conventional cutting apparatus. In the illustrated embodiment, portions of the outer wall 11a of the side rail 11 are removed so as to provide two flanges 21 and 22 that can be bent inwardly within the side rail 11 to form the opening 20. In the illustrated embodiment, the flanges 21 and 22 are sized to extend through the side rail 11 such that the respective edges thereof abut the inner surface of the inner wall 11b, although such is not necessary. If desired, tabs 23 and 24 can be respectively formed on the flanges 21 and 22. The illustrated tabs 23 and 24 extend outwardly apart from one another and extend along the inner surface of the inner wall 11b of the side rail 11, although such is not necessary. Also, if desired, respective apertures 23a and 24a may be formed through the tabs 23 and 24 for a purpose that will be explained below. If desired, one or more apertures 25 and 26 may be formed through the inner wall 11b of the side rail 11 for a purpose that will be explained below.

A combined internal reinforcing member and mounting bracket, indicated generally at 30, is secured to the side rail 11. The illustrated reinforcing member and bracket 30 is generally U-shaped, including a pair of side walls 31 and 32 that are connected together by an upper wall 33. However, the reinforcing member and bracket 30 may be formed having any desired shape. An enlarged opening 33a is formed through the upper wall 33 of the reinforcing member and bracket 30. The opening 33a is intended to be representative of any structure for facilitating the securement of any portion of the vehicle (not illustrated) to the reinforcing member and bracket 30 and, thus, the vehicle body and frame assembly 10. The illustrated side walls 31 and 32 are perforated in a conventional manner to provide respective outwardly extending tabs 34 and 35, although such is not necessary. Similarly, the inner end of the illustrated upper wall 33 is formed having a downwardly extending tab 36, although such is not necessary. The tabs 34 and 35 and the tab 36 are separated by a second distance $D_2$ that is preferably approximately the same as the distance $D_1$. The reinforcing member and bracket 30 is preferably formed from a flat stamping of a rigid metallic material that is cut and bent or otherwise formed in the desired configuration.

The reinforcing member and bracket 30 is assembled to the side rail 11 by moving it laterally (as indicated by the arrows in FIG. 2) such that the side walls 31 and 32 and the upper wall 33 are inserted through the opening 20 until the tabs 34 and 35 respectively formed on the side walls 32 and 31 abut the outer surface of the outer wall 11a and the tab 36 formed on the upper wall 33 abuts the inner surface of the inner wall 11b, as shown in FIG. 3. Them; portions of the reinforcing member and bracket 30 are secured to the side rail 11 in any conventional manner, such as by welding. For example, the portions of the sidwalls 31 and 32 and the upper wall 33 of the reinforcing member and bracket 30 can be welded to the adjacent portions of the outer wall 11a of the side rail 11. Preferably, the tabs 34 and 35 of the side walls 32 and 31, respectively, are welded to the outer surface of the outer wall 11a. Similarly, the tab 36 of the upper wall 33 is preferably welded to the inner surface of the inner wall 11b. Additionally, the tabs 23 and 24 on the flanges 21 and 22, respectively, can be welded to the inner surface of the inner wall 11b. The apertures 23a and 24a can facilitate the formation of such welds. The apertures 25 and 26 can facilitate the use of a welding tool (not shown) to perform some or all of these operations. When assembled with and secured to the side rail 11 in this manner, the reinforcing member and bracket 30 functions as a dual purpose member, providing structural reinforcement for the side rail 11 and simultaneously providing a mounting point for an ancillary component (not shown) of the vehicle, such as a shock absorber, body portion, and the like.

Figure 4:
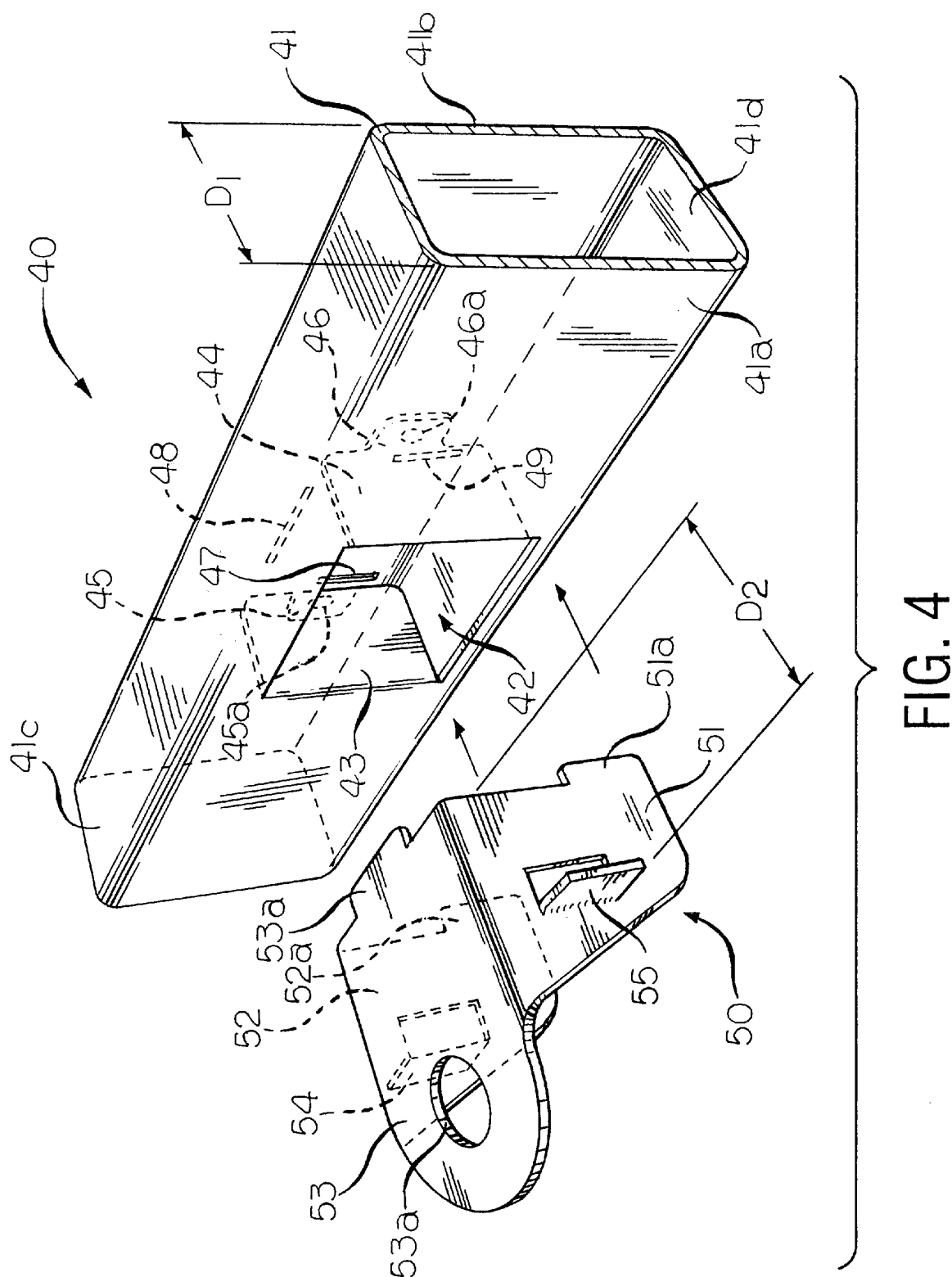
FIG. 4 is an enlarged exploded perspective view of a portion of a second embodiment of a closed channel structural member and combined internal reinforcing member and mounting bracket in accordance with this invention.
Figure 5:
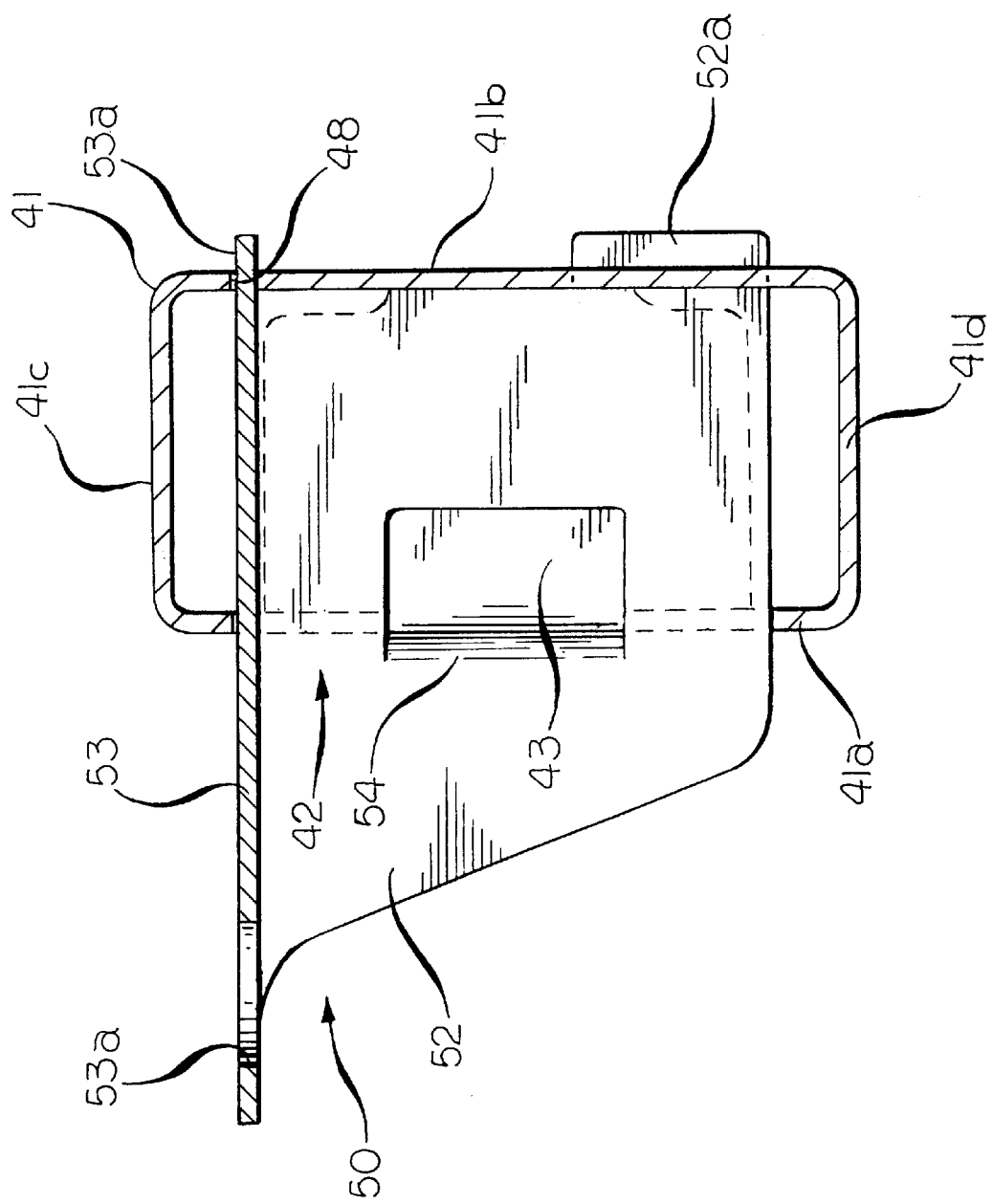
FIG. 5 is an enlarged sectional elevational view of the closed channel structural member and combined internal reinforcing member and mounting bracket illustrated in FIG. 4 shown assembled.

Referring now to FIGS. 4 and 5, there is illustrated a portion of a second embodiment of a vehicle body frame assembly, indicated generally at 40, in accordance with this invention. The vehicle frame assembly 40 is generally similar to the vehicle frame assembly 10 described above and includes a pair of longitudinally extending side rails (only one of which is illustrated at 41) or similar structural members having a plurality of transverse cross members (not shown) or similar structural members extending therebetween. The structure of a portion of the side rail 41 is illustrated in detail in FIGS. 4 and 5. Although this invention will be described and illustrated in context of the side rail 41, it will be appreciated that this invention may be practiced with any or all of the other structural members of the vehicle frame assembly 40, as discussed above. The illustrated side rail 41 is generally rectangular in cross sectional shape and includes an outer wall 41a, an inner wall 41b, an upper wall 41c, and a lower wall 41d. The outer wall 41a and the inner wall 41b are separated by a first distance $D_1$. Although this invention will be described and illustrated in context of the side rail 41 having this generally rectangular cross sectional shape, it will be appreciated that this invention may be practiced with a side rail 41 having any desired cross sectional shape. An opening, indicated generally at 42, is formed through the outer wall 41a of the side rail 41. Although this invention will be described and illustrated with the opening 42 formed through the outer wall 41a, it will be appreciated that the invention can be practiced by forming the opening through any of the walls 41a, 41b, 41c, and 41d. The opening 42 can be formed in any desired manner, such as by a conventional cutting apparatus. In the illustrated embodiment, portions of the outer wall 41a of the side rail 41 are removed so as to provide two flanges 43 and 44 that can be bent inwardly within the side rail 41 to form the opening 42. In the illustrated embodiment, the flanges 43 and 44 are sized to extend through the side rail 41 such that the respective edges thereof abut the inner surface of the inner wall 41b, although such is not necessary. If desired, respective tabs 45 and 46 can be formed on the flanges 43 and 44. The illustrated tabs 45 and 46 extend outwardly apart from one another and extend along the inner surface of the inner wall 41b of the side rail 41, although such is not necessary. Also, if desired, respective apertures 45a and 46a may be formed through the tabs 45 and 46 for a purpose that will be explained below. If desired, one or more slots 47, 48, and 49 may be formed through the inner wall 41b of the side rail 41 for a purpose that will be explained below.

A combined internal reinforcing member and mounting bracket, indicated generally at 50, is secured to the side rail 11. The illustrated reinforcing member and bracket 50 is generally U-shaped, including a pair of side walls 51 and 52 that are connected together by an upper wall 53. An enlarged opening 53a is formed through the upper wall 53 of the reinforcing member and bracket 50. The opening 53a is intended to be representative of any structure for facilitating the securement of any portion of the vehicle (not illustrated) to the reinforcing member and bracket 50 and, thus, the vehicle body and frame assembly 40. The illustrated side walls 51 and 52 are perforated in a conventional manner to provide respective outwardly extending tabs 54 and 55, although such is not necessary. The tabs 54 and 55 and the inner ends of the side walls 51 and 52 are separated by a second distance $D_2$ that is preferably approximately the same as or slightly larger than the distance $D_1$. The inner ends of the illustrated side walls 51 and 52 are formed having respective transversely extending protrusions 51a and 52a, although such is not necessary. Similarly, the inner end of the illustrated upper wall 53 is formed having a transversely extending protrusion 53a, although such is not necessary. The reinforcing member and bracket 50 is preferably formed from a flat stamping of a rigid metallic material that is cut and bent or otherwise formed in the desired configuration.

The reinforcing member and bracket 50 is assembled to the side rail 41 by moving it laterally (as indicated by the arrows in FIG. 4) such that the side walls 51 and 52 and the upper wall 53 are inserted through the opening 42 until the tabs 54 and 55 abut the outer surface of the outer wall 41a, as shown in FIG. 5. When this occurs, the protrusions 51a, 52a, and 53a are received within the slots 47, 48, and 49, as shown in FIG. 5. Then, portions of the reinforcing member and bracket 50 are secured to the side rail 51 in any conventional manner, such as by welding. For example, the portions of the side walls 51 and 52 and the upper wall 53 of the reinforcing member and bracket 50 can be welded to the adjacent portions of the outer wall 41a of the side rail 41. Preferably, the tabs 54 and 55 of the side walls 52 and 51, respectively, are welded to the outer surface of the outer wall 41a. Similarly, the protrusions 51a, 52a, and 53a are preferably welded to the inner surface of the inner wall 41b. Additionally, the tabs 45 and 46 on the flanges 43 and 44, respectively, can be welded to the inner surface of the inner wall 41b. The apertures 45a and 45b can facilitate the use of a welding tool (not shown) to perform some or all of these operations. When assembled with and secured to the side rail 41 in this manner, the reinforcing member and bracket 50 functions as a dual purpose member, providing structural reinforcement for the side rail 41 and simultaneously providing a mounting point for an ancillary component (not shown) of the vehicle, such as a shock absorber, body portion, and the like.

Figure 6:
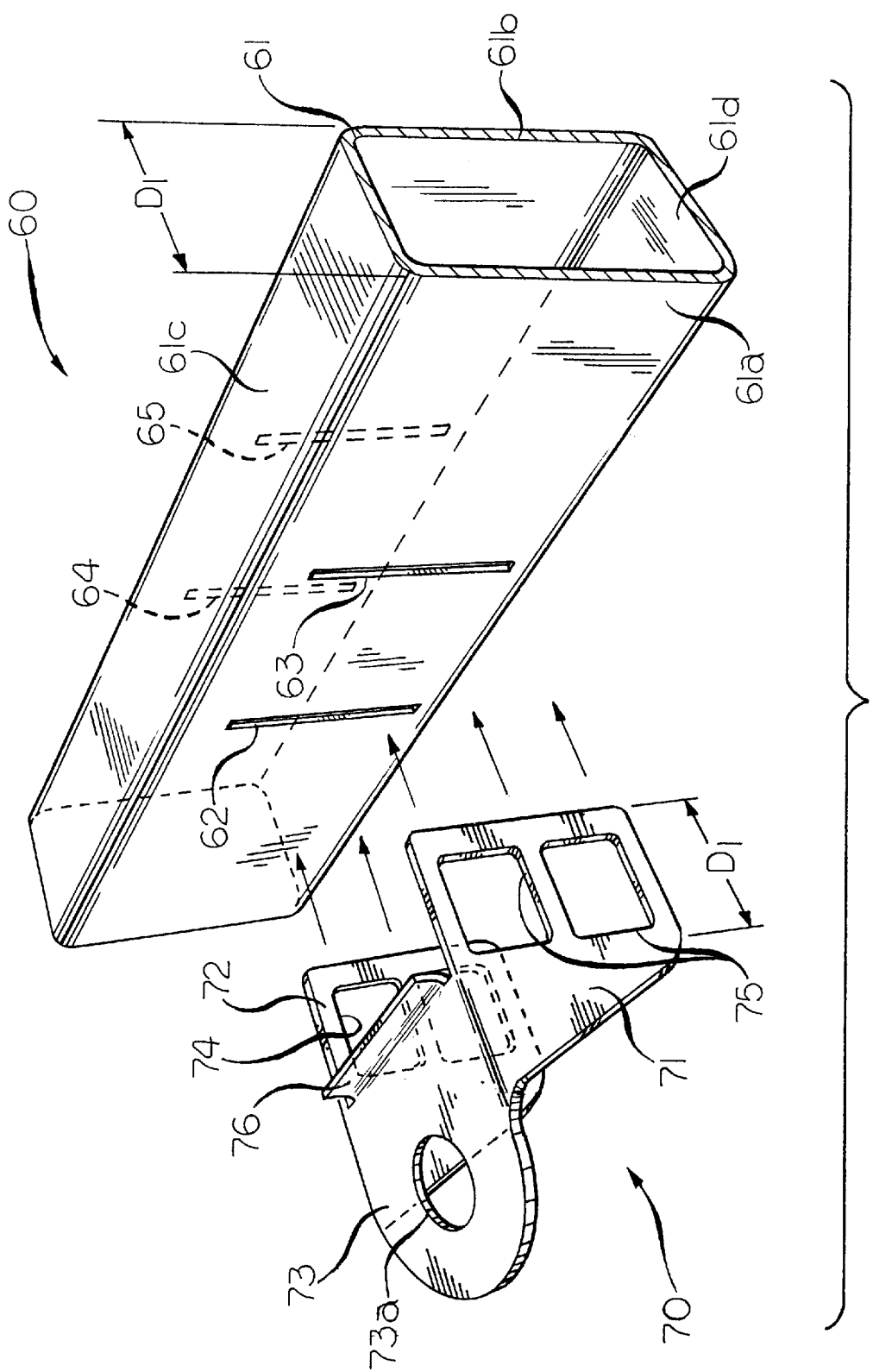
FIG. 6 is an enlarged exploded perspective view of a portion of a third embodiment of a closed channel structural member and combined internal reinforcing member and mounting bracket in accordance with this invention.
Figure 7:
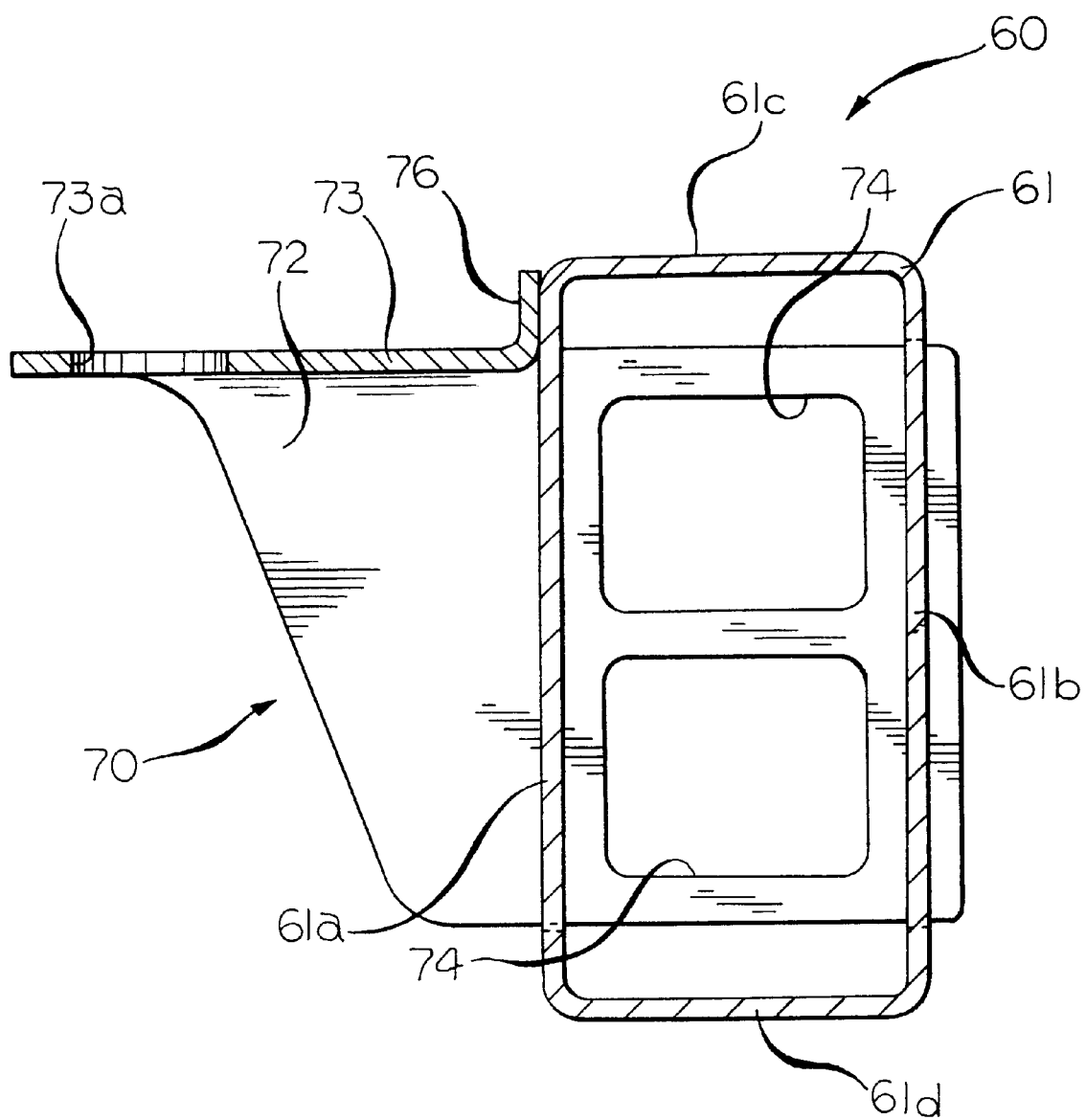
FIG. 7 is an enlarged sectional elevational view of the closed channel structural member and combined internal reinforcing member and mounting bracket illustrated in FIG. 6 shown assembled.

Referring now to FIGS. 6 and 7, there is illustrated a portion of a third embodiment of a vehicle body frame assembly, indicated generally at 60, in accordance with this invention. The vehicle frame assembly 60 is generally similar to the vehicle frame assembly 10 described above and includes a pair of longitudinally extending side rails (only one of which is illustrated at 61) or similar structural members having a plurality of transverse cross members (not shown) or similar structural members extending therebetween. The structure of a portion of the side rail 61 is illustrated in detail in FIGS. 6 and 7. Although this invention will be described and illustrated in context of the side rail 61, it will be appreciated that this invention may be practiced with any or all of the other structural members of the vehicle frame assembly 60, as discussed above. The illustrated side rail 61 is generally rectangular in cross sectional shape and includes an outer wall 61a, an inner wall 61b, an upper wall 61c, and a lower wall 61d. The outer wall 61a and the inner wall 61b are separated by a first distance $D_1$. Although this invention will be described and illustrated in context of the side rail 61 having this generally rectangular cross sectional shape, it will be appreciated that this invention may be practiced with a side rail 61 having any desired cross sectional shape. A pair of slots 62 and 63 are formed through the outer wall 61a of the side rail 61. Similarly, a pair of slots 64 and 65 are formed through the inner wall 61b of the side rail 61. Preferably, the slot 62 is transversely aligned with the slot 64, and the slot 63 is transversely aligned with the slot 65. The slots 62, 63, 64, and 65 can be formed in any desired manner, such as by a conventional cutting apparatus, and may have any desired shape.

A combined internal reinforcing member and mounting bracket, indicated generally at 70, is secured to the side rail 61. The illustrated reinforcing member and bracket 70 is generally U-shaped, including a pair of side walls 71 and 72 that are connected together by an upper wall 73. An enlarged opening 73a is formed through the upper wall 73 of the reinforcing member and bracket 70. The opening 73a is intended to be representative of any structure for facilitating the securement of any portion of the vehicle (not illustrated) to the reinforcing member and bracket 70 and, thus, the vehicle body and frame assembly 60. The illustrated side wall 71 is perforated in a conventional manner to provide one or more openings 75, although such is not necessary. Similarly, the illustrated side wall 72 is perforated in a conventional manner to provide one or more openings 74, although such is not necessary. The openings 74 and 75 can be formed in any desired manner, such as by a conventional cutting apparatus, and may have any desired shape. The openings 74 and 75 are provided to lessen the overall weight of the reinforcing member and bracket 70. The inner end of the illustrated upper wall 73 is formed having an upwardly extending tab 76, although such is not necessary. The tab 73a and the inner ends of the side walls 71 and 72 are separated by a second distance $D_2$ that is preferably approximately the same as or slightly larger than the distance $D_1$. The reinforcing member and bracket 70 is preferably formed from a flat stamping of a rigid metallic material that is cut and bent or otherwise formed in the desired configuration.

The reinforcing member and bracket 70 is assembled to the side rail 61 by moving it laterally (as indicated by the arrows in FIG. 6) such that the side walls 71 and 72 are inserted through the slots 63 and 62, respectively until the upwardly extending tab 76 of the upper wall 73 abuts the outer surface of the inner wall 61b of the side rail, as shown in FIG. 7. When this occurs, the leading edges of the side walls 71 and 72 are received within or extend completely through the slots 65 and 64, respectively, as also shown in FIG. 7. Then, portions of the reinforcing member and bracket 70 are secured to the side rail 61 in any conventional manner, such as by welding. For example, the portions of the side walls 71 and 72 and the upwardly extending tab 76 of the upper wall 73 of the reinforcing member and bracket 70 can be welded to the adjacent portions of the outer wall 61a of the side rail 61. Preferably, the leading edges of the side walls 71 and 72 are welded to the inner surface of the inner wall 61b. When assembled with and secured to the side rail 61 in this manner, the reinforcing member and bracket 70 functions as a dual purpose member, providing structural reinforcement for the side rail 61 and simultaneously providing a mounting point for an ancillary component (not shown) of the vehicle, such as a shock absorber, body portion, and the like.

Figure 8:
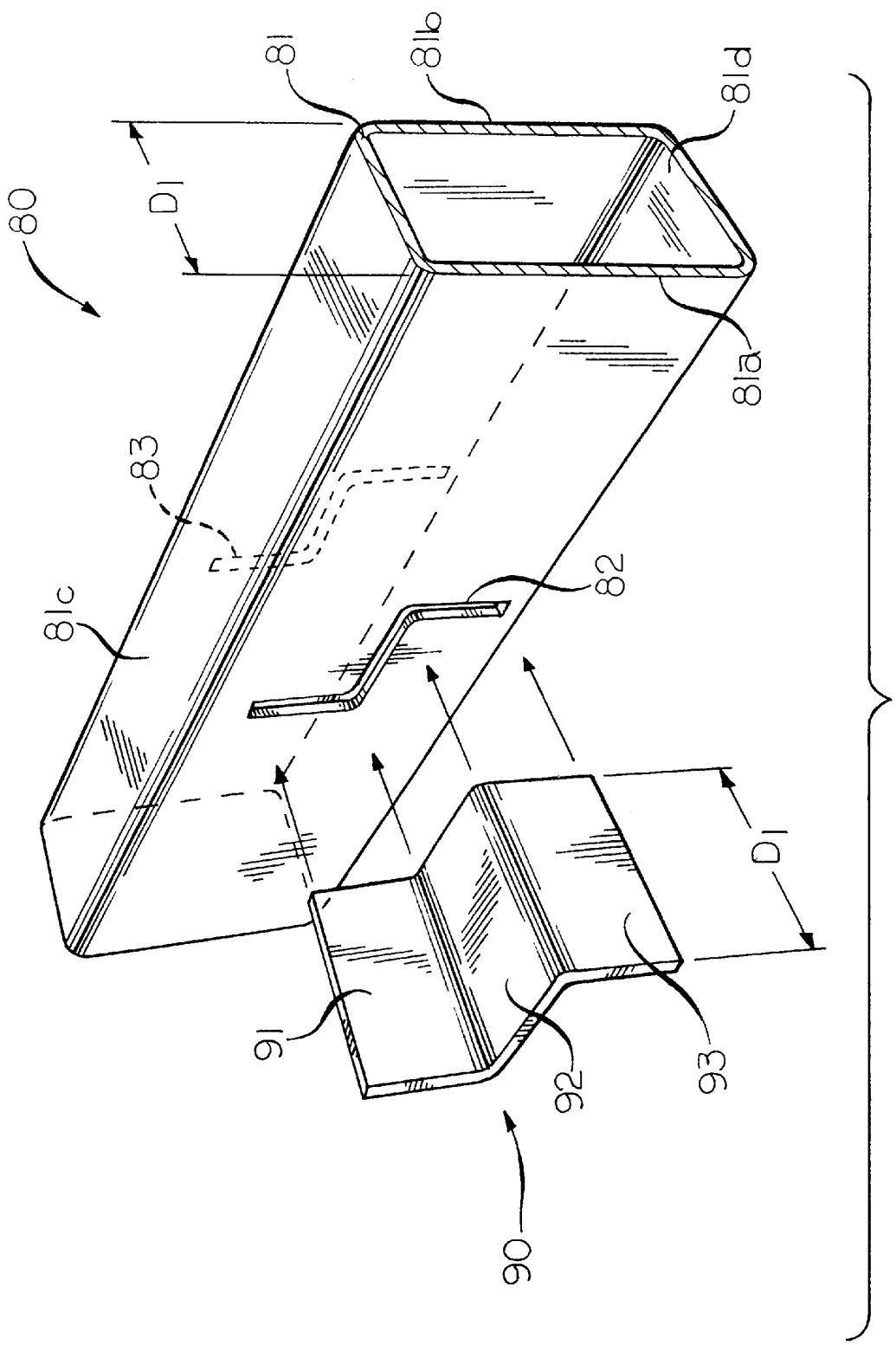
FIG. 8 is an enlarged exploded perspective view of a portion of a fourth embodiment of a closed channel structural member and internal reinforcing member in accordance with this invention.
Figure 9:
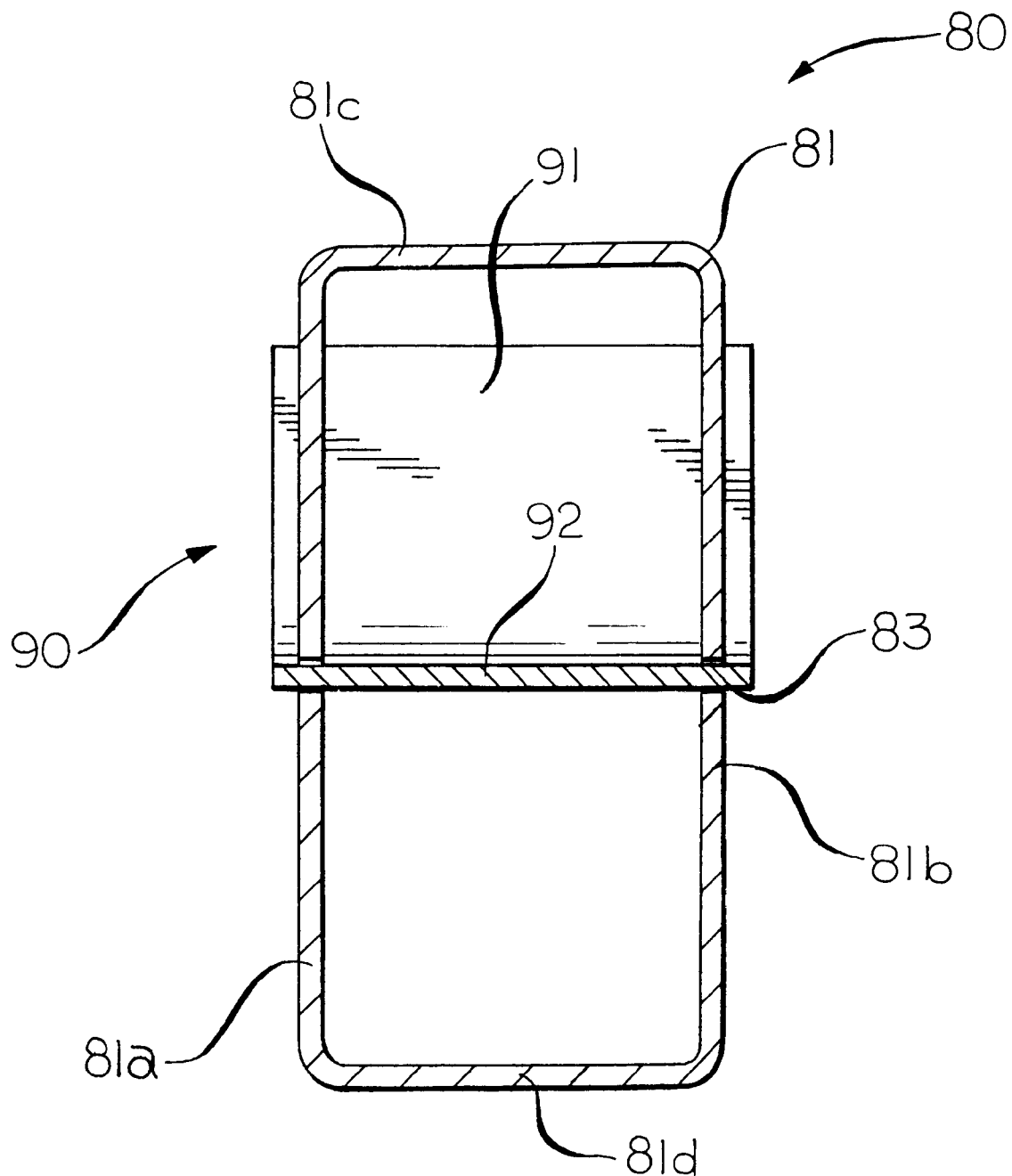
FIG. 9 is an enlarged sectional elevational view of the closed channel structural member and internal reinforcing member illustrated in FIG. 8 shown assembled.

Referring now to FIGS. 8 and 9, there is illustrated a portion of a fourth embodiment of a vehicle body frame assembly, indicated generally at 80, in accordance with this invention. The vehicle frame assembly 80 is generally similar to the vehicle frame assembly 10 described above and includes a pair of longitudinally extending side rails (only one of which is illustrated at 81) or similar structural members having a plurality of transverse cross members (not shown) extending therebetween. The structure of a portion of the side rail 81 is illustrated in detail in FIGS. 8 and 9. Although this invention will be described and illustrated in context of the side rail 81, it will be appreciated that this invention may be practiced with any or all of the other structural members of the vehicle frame assembly 80, as discussed above. The illustrated side rail 81 is generally rectangular in cross sectional shape and includes an outer wall 81a, an inner wall 81b, an upper wall 81c, and a lower wall 81d. The outer wall 81a and the inner wall 81b are separated by a first distance $D_1$. Although this invention will be described and illustrated in context of the side rail 81 having this generally rectangular cross sectional shape, it will be appreciated that this invention may be practiced with a side rail 81 having any desired cross sectional shape. A first slot 82 is formed through the outer wall 81a of the side rail 81. Similarly, a second slot 83 is formed through the inner wall 81b of the side rail 81. Preferably, the first slot 82 is transversely aligned with the second slot 83. The slots 82 and 83 can be formed in any desired manner, such as by a conventional cutting apparatus, and may have any desired shape.

An internal reinforcing member, indicated generally at 90, is secured to the side rail 81. The illustrated reinforcing member 90 is shaped in accordance with the slots 82 and 83, including a first upwardly extending panel 91, a second laterally extending panel 92, and a third downwardly extending panel 93. The internal reinforcing member 90 defines a transverse dimension $D_2$ that is preferably approximately the same as or slightly larger than the distance $D_1$. The reinforcing member 90 is preferably formed from a flat stamping of a rigid metallic material that is cut and bent or otherwise formed in the desired configuration.

The reinforcing member 90 is assembled to the side rail 81 by moving it laterally (as indicated by the arrows in FIG.

8) such that the panels 91, 92, and 93 are inserted through the slots 82 and 83. When this occurs, the leading and trailing edges of the reinforcing member 90 are received within or extend completely through the slots 82 and 83, as also shown in FIG. 9. Then, portions of the reinforcing member 90 are secured to the side rail 61 in any conventional manner, such as by welding. For example, the trailing edges of the reinforcing member 90 can extend through the first slot 82 and be welded to the adjacent portions of the outer wall 81a of the side rail 81. Similarly, the leading edges of the reinforcing member 90 can extend through the second slot 83 and be welded to the adjacent portions of the inner wall 81b of the side rail 81. When assembled with and secured to the side rail 81 in this manner, the reinforcing member 90 functions as a single purpose member, providing structural reinforcement for the side rail 81.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A combined closed channel structural member and reinforcement assembly comprising:
    a closed channel structural member having a continuous cross sectional shape, said closed channel structural member having a portion removed so as to provide an opening;
    a reinforcing member extending through said opening, portions of said reinforcing member being secured to said closed channel structural member to form a combined closed channel structural member and reinforcement assembly.

2. The combined closed channel structural member and reinforcement assembly defined in claim 1 wherein said closed channel structural member includes a first wall and a second wall, said opening is formed through said first wall, and said reinforcing member extends through said opening formed through said first wall into abutment with said second wall.

3. The combined closed channel structural member and reinforcement assembly defined in claim 2 wherein portions of said first wall are removed so as to provide a flange that is deformed within said closed channel structural member to form said opening.

4. The combined closed channel structural member and reinforcement assembly defined in claim 3 wherein said flange abuts said second wall of said closed channel structural member.

5. The combined closed channel structural member and reinforcement assembly defined in claim 3 wherein portions of said first wall are removed so as to provide a pair of flanges that are deformed within said closed channel structural member to form said opening.

6. The combined closed channel structural member and reinforcement assembly defined in claim 5 wherein each of said flanges abuts said second wall of said closed channel structural member.

7. The combined closed channel structural member and reinforcement assembly defined in claim 1 wherein said reinforcing member includes a tab that abuts said first wall of said closed channel structural member.

8. The combined closed channel structural member and reinforcement assembly defined in claim 1 wherein said reinforcing member includes a pair of tabs that abut said first wall of said closed channel structural member.

9. The combined closed channel structural member and reinforcement assembly defined in claim 2 wherein said second wall has a slot formed there through, and wherein a portion of said reinforcing member is received within said slot.

10. The combined closed channel structural member and reinforcement assembly defined in claim 1 wherein said second wall has a pair of slots formed there through, and wherein portions of said reinforcing member are received within said slots.

11. A vehicle frame assembly comprising:
    a plurality of structural components that are connected together to form a vehicle frame assembly, at least one of said structural components being a closed channel structural member having a continuous cross sectional shape, said closed channel structural member having a portion removed so as to provide an opening; and
    a reinforcing member extending through said opening, portions of said reinforcing member being secured to said closed channel structural member to form a combined closed channel structural member and reinforcement assembly for the vehicle frame assembly.

12. The vehicle frame assembly defined in claim 11 wherein said closed channel structural member includes a first wall and a second wall, said opening is formed through said first wall, and said reinforcing member extends through said opening formed through said first wall into abutment with said second wall.

13. The vehicle frame assembly defined in claim 12 wherein portions of said first wall are removed so as to provide a flange that is deformed within said closed channel structural member to form said opening.

14. The vehicle frame assembly defined in claim 13 wherein said flange abuts said second wall of said closed channel structural member.

15. The vehicle frame assembly defined in claim 13 wherein portions of said first wall are removed so as to provide a pair of flanges that are deformed within said closed channel structural member to form said opening.

16. The vehicle frame assembly defined in claim 15 wherein each of said flanges abuts said second wall of said closed channel structural member.

17. The vehicle frame assembly defined in claim 11 wherein said reinforcing member includes a tab that abuts said first wall of said closed channel structural member.

18. The vehicle frame assembly defined in claim 11 wherein said reinforcing member includes a pair of tabs that abut said first wall of said closed channel structural member.

19. The vehicle frame assembly defined in claim 12 wherein said second wall has a slot formed there through, and wherein a portion of said reinforcing member is received within said slot.

20. The vehicle frame assembly defined in claim 11 wherein said second wall has a pair of slots formed there through, and wherein portions of said reinforcing member are received within said slots.

* * * * *